(12) United States Patent
Xu et al.

(10) Patent No.: US 12,135,257 B1
(45) Date of Patent: Nov. 5, 2024

(54) PERCEPTION EVALUATION METHOD FOR SERVICE PERFORMANCE OF HIGHWAY TUNNEL LINING STRUCTURE

(71) Applicant: RESEARCH INSTITUTE OF HIGHWAY MINISTRY OF TRANSPORT, Beijing (CN)

(72) Inventors: Xiao Xu, Beijing (CN); Chongbang Xu, Beijing (CN)

(73) Assignee: Research Institute of Highway Ministry of Transport, Beijing (CN)

( * ) Notice: Subject to any disclaimer, the term of this patent is extended or adjusted under 35 U.S.C. 154(b) by 0 days.

(21) Appl. No.: 18/609,556

(22) Filed: Mar. 19, 2024

(30) Foreign Application Priority Data

Jul. 7, 2023 (CN) .......................... 202310825923.X

(51) Int. Cl.
*G01L 5/16* (2020.01)
*E21F 17/18* (2006.01)

(52) U.S. Cl.
CPC ................ *G01L 5/16* (2013.01); *E21F 17/18* (2013.01)

(58) Field of Classification Search
CPC .................................... G01L 5/16; E21F 17/18
See application file for complete search history.

(56) References Cited

U.S. PATENT DOCUMENTS

2021/0017861 A1* 1/2021 Liu .................... G01N 21/954

FOREIGN PATENT DOCUMENTS

| CN | 101435333 A | * | 5/2009 | ............... E21D 9/14 |
|----|-------------|---|--------|--------------------------|
| CN | 104992013 A | * | 10/2015 | ............... G06F 17/50 |
| CN | 105041331 A | * | 11/2015 | ............... E21D 9/14 |
| CN | 106547986 A |   | 3/2017 |                          |
| CN | 105625174 B | * | 8/2017 | ............... E01D 19/14 |
| CN | 108547633 A | * | 9/2018 | ............... E21D 11/00 |
| CN | 110147635 A | * | 8/2019 | ............... G06F 30/13 |
| CN | 107229812 B | * | 8/2020 | ............... G06F 30/20 |
| CN | 110514518 B | * | 3/2021 | ............... E21F 17/18 |
| CN | 114611193 A |   | 6/2022 |                          |
| CN | 115795612 A |   | 3/2023 |                          |

(Continued)

OTHER PUBLICATIONS

First Office Action for China Application No. 202310825923.X, mailed Aug. 5, 2023.

(Continued)

*Primary Examiner* — Tung S Lau
(74) *Attorney, Agent, or Firm* — Pilloff Passino & Cosenza LLP; Rachel K. Pilloff; Sean A. Passino

(57) ABSTRACT

Provided is a perception evaluation method for a bearing capacity of a highway tunnel lining structure, including: from the load effect evolution state of surrounding rock and the decay mechanical state of a lining structure, the characterization index system of a highway tunnel bearing capacity is constructed; a characterization index inversion function relationship based on strain data of an inner surface of the highway tunnel lining is provided, a bearing capacity perception layout scheme of the tunnel structure is constructed accordingly, and a complete set of perception method for bearing capacity characterization indexes is obtained; then, by calculating a load effect function and a resistance effect function, the calculation and evaluation method of the tunnel structure bearing capacity.

2 Claims, 9 Drawing Sheets

(56) References Cited

FOREIGN PATENT DOCUMENTS

| | | |
|---|---|---|
| CN | 115859444 A | 3/2023 |
| GB | 1286957 A | 8/1972 |

OTHER PUBLICATIONS

Notice to Grant Patent for China Application No. 202310825923.X, mailed Aug. 14, 2023.
First Search Report for for China Application No. 202310825923.X, dated Aug. 4, 2023.
Supplementary Search Report for for China Application No. 202310825923.X, dated Aug. 10, 2023.

* cited by examiner

PERCEPTION EVALUATION METHOD FOR SERVICE PERFORMANCE OF HIGHWAY TUNNEL LINING STRUCTURE

CROSS-REFERENCE TO RELATED APPLICATIONS

This application claims priority to Chinese Patent Application No. 202310825923.X, filed on Jul. 7, 2023, the contents of which are hereby incorporated by reference.

TECHNICAL FIELD

The disclosure belongs to the technical field of highway tunnel structural safety, and in particular relates to a perception evaluation method for a bearing capacity of a highway tunnel lining structure.

BACKGROUND

Tunnel engineering is an underground project with randomness and uncertainty in the host environment. There are many difficulties in accurately calculating the bearing state and the safety characteristics of the tunnel lining structure, including accurately determining the actual stress state, the structural failure characteristics and the structural failure process of the tunnel lining structure.

The scale of tunnel engineering in China is increasing, and the bearing capacity of the tunnel structure is the core of tunnel facilities safety and the key point of tunnel structure research, running through aspects of tunnel structure design, tunnel construction, tunnel operation and maintenance, tunnel treatment and reinforcement. The bearing capacity of the structure may be greatly reduced as a result of the damage of the lining structure, causing the safety of the lining structure to be impaired and imposing a serious threat to the operation quality and safety of the tunnel. However, a technical condition evaluation method based on structural state description is implemented according to the current national standard Technical Specifications of Maintenance for Highway Tunnel, with no structural bearing capacity evaluation method based on strict mechanical analysis, which leads to the failure of solving the problem of the extent or state at which structural lining damage develops before the structure becomes unstable, and such a situation seriously undermines the credibility of tunnel structure evaluation.

At present, there are relatively few studies on mechanisms of deformation and damage evolution of the tunnel structure under different loads, and there is a lack of quantitative analysis basis for the residual bearing capacity of the structure, the above situations are not conducive to structural health degree evaluation and determination of maintenance and treatment schemes. In the evaluation of the technical condition of the tunnel lining structure, there is a lack of studies on the corresponding relationship between the lining bearing capacity and the structural technical conditions (health degree and safety), and most of the prior art evaluate the damage grade and the structural health state from the qualitative or semi-quantitative point of view, and the quantitative analysis of bearing capacity is not perfect; in addition, it is difficult to quantitatively and quickly analyze the residual bearing capacity of the tunnel structure and evaluate the structural health state simply by using damage investigation, analysis and evaluation. At present, the evaluation methods of tunnel lining structure (technical condition) are mostly based on structural state description, and the evaluation methods based on (strict) mechanical analysis are relatively few. Further, the evaluation method of lining structure (safety) based on bearing capacity analysis, or the evaluation method for the bearing capacity of the lining structure is still very few.

SUMMARY

The disclosure provides a perception evaluation method for a bearing capacity of a highway tunnel lining structure, so as to solve the technical problems existing in the prior art.

In order to achieve the above purpose, the present disclosure provides a perception evaluation method for the bearing capacity of the highway tunnel lining structure, including:

constructing a characterization index system of a highway tunnel bearing capacity, where the characterization index system includes: characterization indexes of a load effect evolution state of surrounding rock and characterization indexes of a decay mechanical state of a lining structure;

constructing a characterization index inversion mapping relationship based on strain data of an inner surface of the highway tunnel lining, obtaining a bearing capacity perception layout scheme of the highway tunnel structure based on the characterization index system, obtaining a complete set of perception method for bearing capacity characterization indexes based on the characterization index system, the characterization index inversion mapping relationship and the bearing capacity perception layout scheme; and comprehensively applying the complete set of perception method for the bearing capacity characterization indexes and a calculation method with a design specification, respectively fusing a load correction coefficient and a reduction coefficient, calculating to obtain a load effect function and a resistance effect function, obtaining an importance coefficient and a bearing capacity checking coefficient of the highway tunnel structure, and obtaining a bearing capacity calculation and evaluation model of the highway tunnel structure based on the importance coefficient, the bearing capacity checking coefficient, the load effect function and the resistance effect function, and carrying out a bearing capacity perception evaluation on the highway tunnel lining structure based on the bearing capacity calculation and evaluation model.

Optionally, a process of constructing the characterization index system of the highway tunnel bearing capacity includes:

obtaining geological types of the highway tunnel, and based on the geological types, combining with a load response correction method of a geological uncertainty evolution of the surrounding rock, obtaining the characterization indexes of the load effect evolution state of the surrounding rock;

respectively obtaining deformation indexes, stress indexes, damage characteristic indexes and environmental indexes of the highway tunnel, and based on the deformation indexes, the stress indexes, the damage characteristic indexes and the environmental indexes, obtaining the characterization indexes of the decay mechanical state of the lining structure; and according to a classification of different geological types, constructing a key characterization index system of a tunnel structure bearing capacity based on the characterization indexes of the load effect evolution state of the surrounding rock and the characterization indexes of the decay mechanical state of the lining structure.

Optionally, a process of constructing the characterization index inversion mapping relationship based on the strain data on the inner surface of the highway tunnel lining includes:

deducing a radial displacement $v(\varphi)$ from a geometric equation of a curved beam theory as $$\frac{d^2v(\varphi)}{d\varphi^2} + v(\varphi) = -\frac{R^2\varepsilon(\varphi)}{d};$$

an internal force and an external load are:

$$M(\varphi) = -\frac{EI\varepsilon(\varphi)}{d}$$
$$\begin{cases} \frac{Q(\varphi)}{R} + q_s(\varphi) = 0 \\ \frac{dQ(\varphi)}{Rd\varphi} + q_y(\varphi) = 0, \\ \frac{dM(\varphi)}{Rd\varphi}1 = -Q(\varphi) \end{cases}$$

where $v(\varphi)$ is the radial displacement; M and Q are internal forces of the lining, respectively representing a bending moment and a shear force of a section; q represents an external load, where $q_y$ is radial and $q_s$ is circumferential; $\varepsilon(\varphi)$ is a circumferential strain on the inner surface of the structure, and $\varphi$ is a circumferential angle with section symmetry axis as an origin, d is a radial distance, R is a radius, and E, A and I are material parameters.

Optionally, a process of obtaining the bearing capacity perception layout scheme of the highway tunnel structure includes:

defining an inversion data requirement based on the characterization index inversion mapping relationship, determining a sensor type based on a spatial long-linear structural characteristic of the geological types and the inversion data requirement, and obtaining the bearing capacity perception layout scheme of the highway tunnel structure based on the sensor type, the structural characteristic and the inversion data requirement.

Optionally, the highway tunnel structure includes a single-center circular tunnel structure and a multi-center circular tunnel structure.

Optionally, a process of calculating the load effect function and the resistance effect function includes:

obtaining the load correction coefficient based on the characterization indexes of the load effect evolution state of the surrounding rock, comprehensively applying the complete set of perception method for the bearing capacity characterization indexes and the calculation method with the design specification, fusing the load correction coefficient, so as to obtain the load effect function; and comprehensively applying the complete set of perception method for the bearing capacity characterization indexes and the calculation method with the design specification, fusing the reduction coefficient, so as to obtain the resistance effect function.

Optionally, the bearing capacity calculation and evaluation model is: $Kq \leq R(\cdot)Z_1$.

where $q(\cdot)$ is the load effect function, $R(\cdot)$ is the resistance effect function, K is the importance coefficient, and $Z_1$ is the bearing capacity checking coefficient.

Compared with the prior art, the disclosure has following advantages and technical effects.

The disclosure firstly constructs a characterization index system of the highway tunnel bearing capacity, then proposes an inversion function relationship of the characterization indexes based on the strain data of the inner surface of the structure, and accordingly obtains a bearing capacity perception layout scheme of the highway tunnel structure; and finally constructs the bearing capacity calculation and evaluation model of the highway tunnel structure, and carries out the bearing capacity perception evaluation on the highway tunnel lining structure based on the bearing capacity calculation and evaluation model. The disclosure may accurately and quantitatively perceive and evaluate the tunnel structure bearing capacity, and solve basic key technical problems of the safety of the highway tunnel structure.

The disclosure studies the geological load state of the surrounding rock and the caused decay mechanical state of the lining structure, calibrates an attribute scale relative to the tunnel structure bearing capacity, constructs an evaluation system of the tunnel structure bearing capacity under different state responses of surrounding rock and lining, and makes up for shortcomings of the current tunnel structure evaluation method based on structural state description. The disclosure provides key common technical support for following research tasks such as long-term monitoring of tunnel civil structure, structural toughness improvement and digital transformation, which is the basic key technology to promote the high-quality development of the highway tunnels, with great significance for in-depth analysis of lining bearing state, structural bearing capacity and structural safety.

BRIEF DESCRIPTION OF THE DRAWINGS

The accompanying drawings, which constitute a part of the disclosure, are used to provide a further understanding of the disclosure. The illustrative embodiments of the disclosure and their descriptions are used to explain the disclosure, and do not constitute an improper limitation of the disclosure.

DETAILED DESCRIPTION OF THE EMBODIMENTS

It should be noted that the embodiments in the disclosure and the features in the embodiments may be combined with each other without conflict. The present disclosure will be described in detail with reference to the attached drawings and embodiments.

It should be noted that the steps shown in the flowchart of the accompanying drawings may be executed in a computer system such as a set of computer-executable instructions, and although a logical order is shown in the flowchart, in some cases, the steps shown or described may be executed in a different order from here.

Embodiment 1

Figure 1:
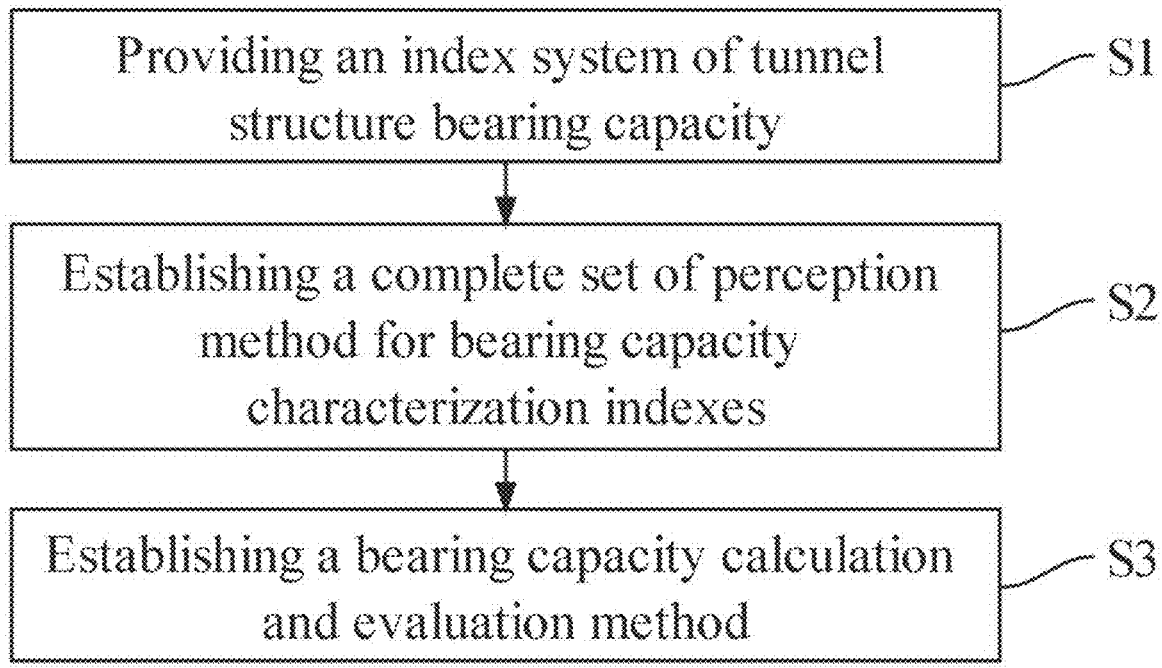
FIG. 1 shows a process illustrating a method according to an embodiment of the present disclosure.
Figure 2:
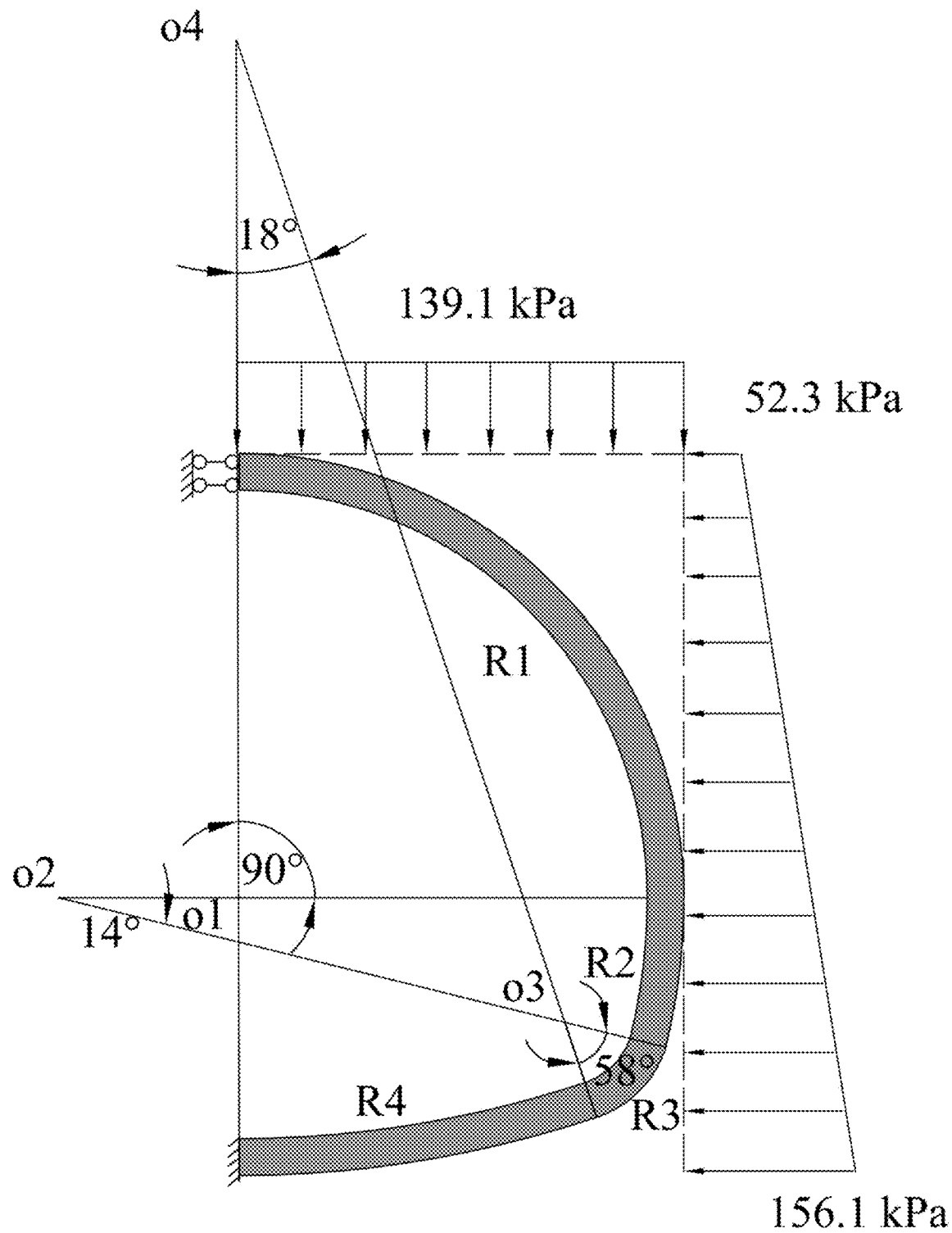
FIG. 2 is a schematic diagram of a calculation model according to an embodiment of the present disclosure.
Figure 3A:
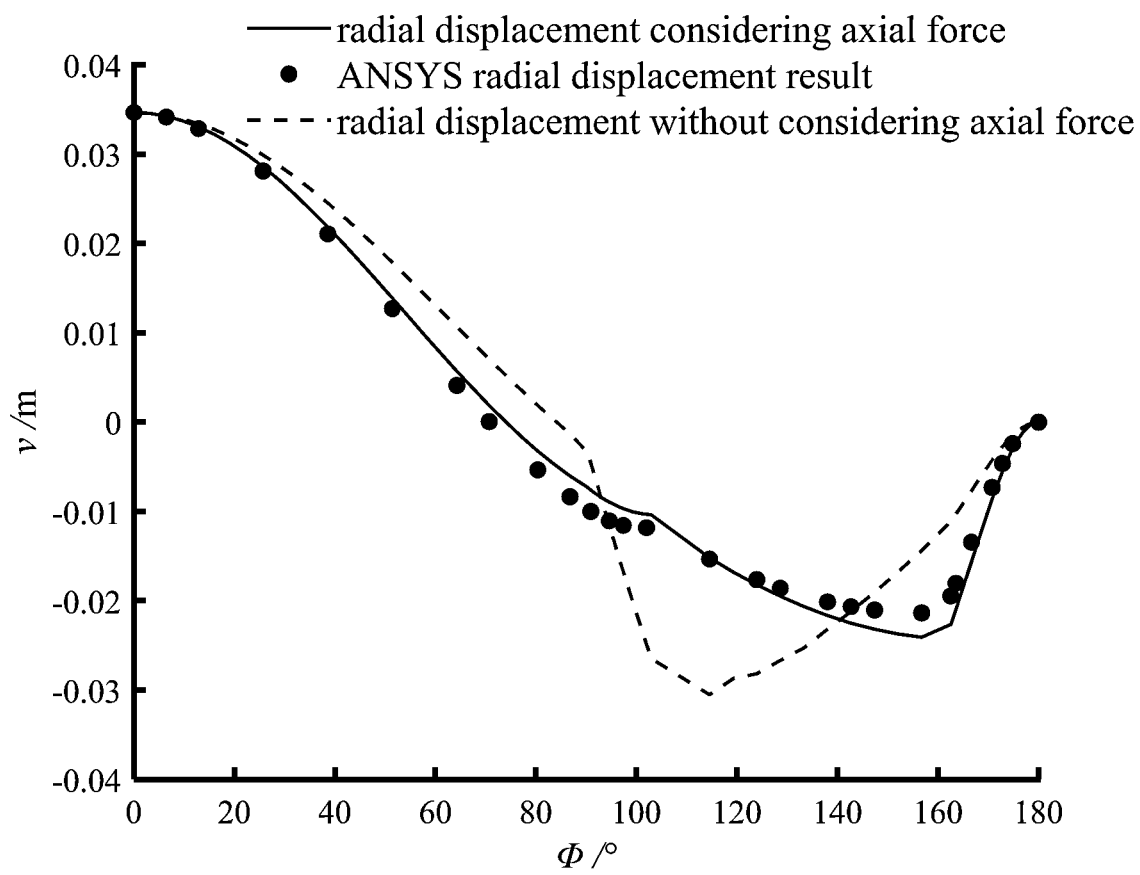
FIG. 3A is a schematic diagram of inversion results of a bending moment and a shear force according to an embodiment of the present disclosure.
Figure 3B:
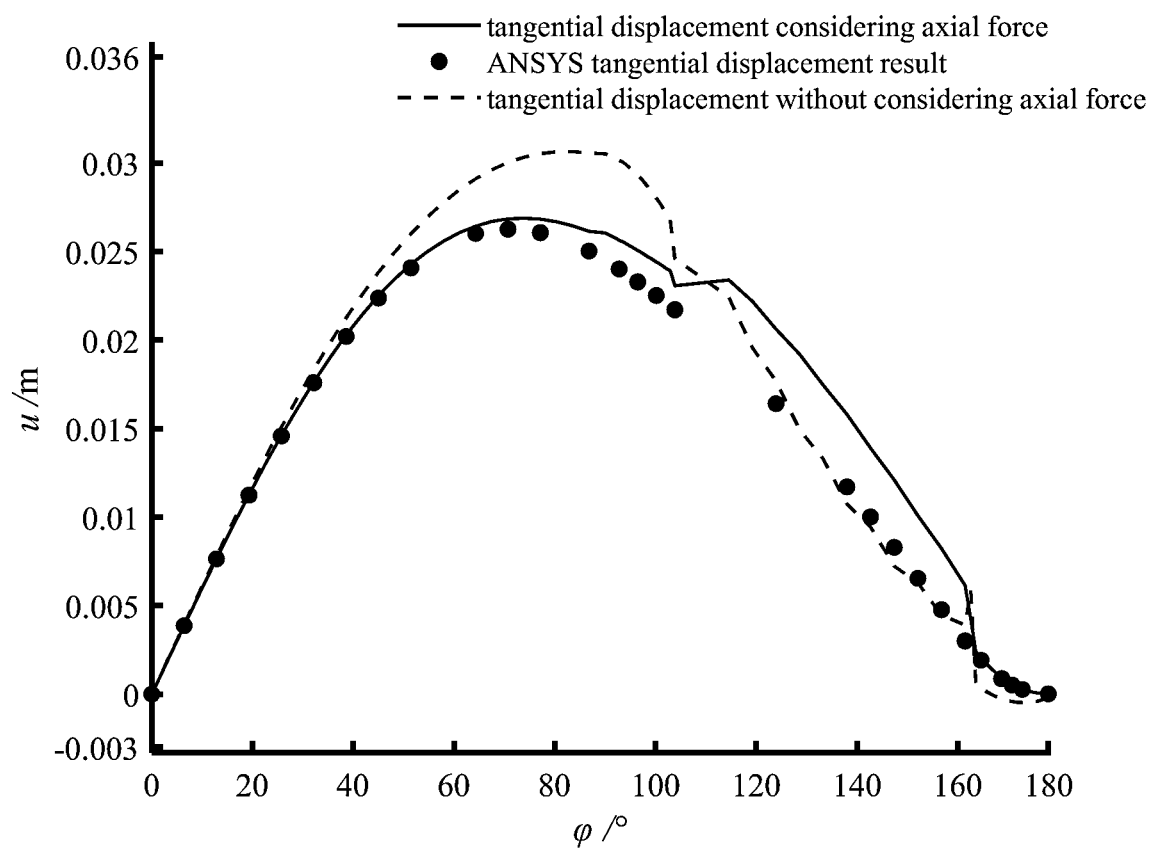
FIG. 3B is a schematic diagram of inversion results of a radial displacement according to an embodiment of the present disclosure.
Figure 3C:
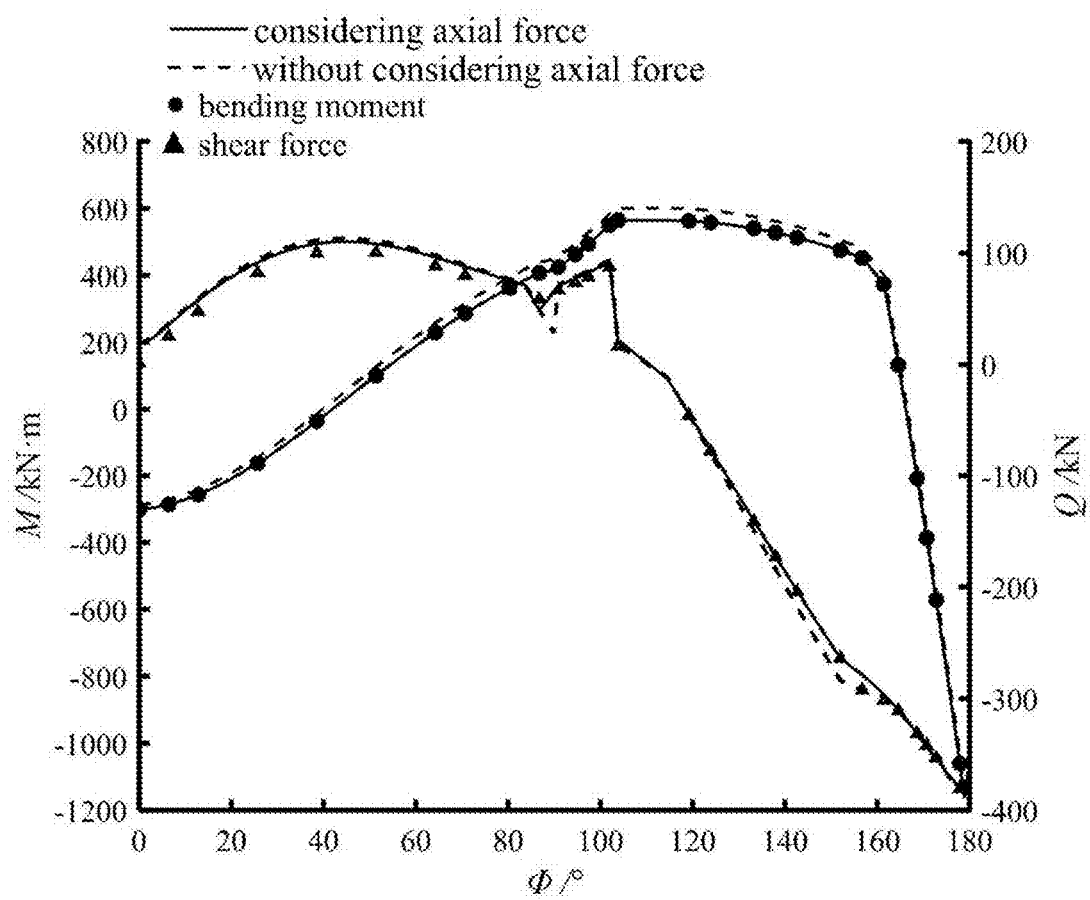
FIG. 3C is a schematic diagram of inversion results of a tangential displacement according to an embodiment of the present disclosure.
Figure 3D:
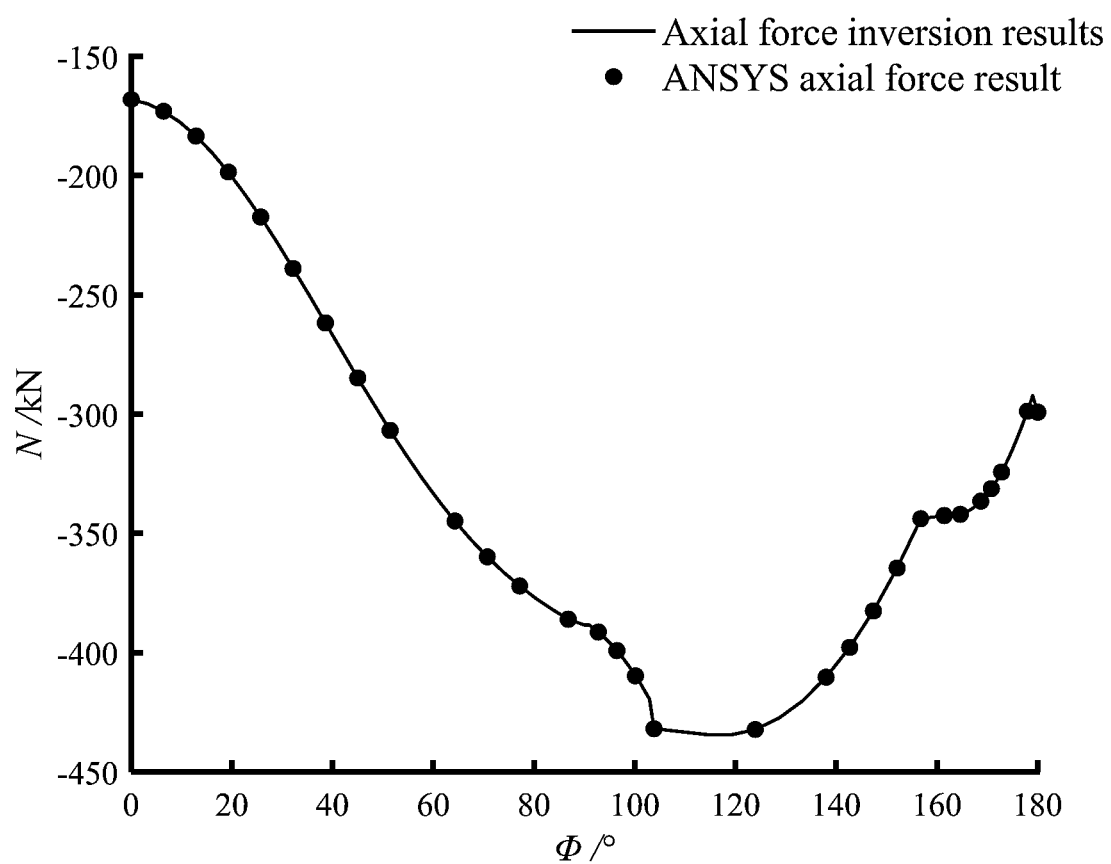
FIG. 3D is a schematic diagram of inversion results of an axial force according to an embodiment of the present disclosure.

As shown in FIG. 1, in this embodiment, a perception evaluation method for a bearing capacity of a highway tunnel lining structure is provided, and including:

S1, constructing a characterization index system of a load effect evolution state of surrounding rock and a decay mechanical state of a lining structure;

following sub-steps are included from two aspects of surrounding rock-lining interaction:

S11, providing characterization indexes of a load effect evolution state of surrounding rock;

differentiating geological sections such as soft rock with large deformation, high water pressure, soft soil, loess, permafrost, expansive rock and soil, active fault zone, karst, strong earthquake area, mined-out area, landslide, etc. modifying the load effect of a geological uncertainty evolution of the surrounding rock from influence paths of different geological structures, and providing the characterization indexes of the load effect evolution state of the surrounding rock;

as for a karst development area, considering the safety, applicability and durability of the tunnel structure according to the shape, location and size of karst cracks, as well as the buried depth, scope and water quality characteristics of karst water from the aspects of cracks and karst water, respectively, where the characterization indexes of the load effect evolution state are mainly the loose pressure caused by cracking and fragmentation of the surrounding rock and the water pressure outside the lining;

S12, providing characterization indexes of a decay mechanical state of a lining structure:

providing the characterization indexes of the decay mechanical state of the lining structure from four aspects of deformation, stress, damage characteristics and environment, where deformation indexes include clearance convergence, vault subsidence, wall foot subsidence, pavement heave, longitudinal differential settlement, tunnel horizontal displacement, tunnel vertical displacement, etc.; stress indexes include contact pressure, earth pressure, water pressure, lining stress, lining surface stress, steel bar stress, etc.; damage characteristics include crack width, water leakage, deformation joint opening, pavement faulting and steel bar corrosion condition, etc.; environmental indexes include environmental temperature inside tunnel, surrounding rock temperature, gas and harmful gases concentrations, vibration speed, etc.;

S13, constructing a characterization index system of a tunnel structure bearing capacity under the combined action of the surrounding rock and the lining.

According to the classification of different geological types, the characterization index system of the tunnel structure bearing capacity under the combined action of the surrounding rock and the lining is constructed. For example, in strong large deformation area, a contact pressure between the surrounding rock and the support, a contact pressure between two layers of support, the lining stress and the steel bar stress are the bearing capacity characterization indexes; in the heavily collapsible loess area, the tunnel vertical displacement and the wall foot subsidence are the main bearing capacity characterization indexes; in karst development area, the main bearing capacity characterization indexes are the water pressure outside the lining, the water leakage and the clearance convergence.

S2, constructing a perception method of the characterization index system of the tunnel structure bearing capacity;

according to the characterization index system provided in the S1, based on the strain data of lining inner surface collected conveniently after operation, the index inversion mapping relationship is constructed, and the perception layout scheme is provided, including following sub-steps:

S21, in view of convenience for layout and later maintenance and replacement, providing the characterization index inversion mapping relationship of bearing capacities of single-center circular tunnel structure and multi-center circular tunnel structure (two-center, three-center and four-center) based on the strain data on the inner surface of the highway tunnel structure, and forming a key characterization index extraction technology, specifically including:

S211, index mapping relationship of the single-center circular tunnel structure:

deducing the radial displacement v(4) from a geometric equation of a curved beam theory as $$\frac{d^2 v(\varphi)}{d\varphi^2} + v(\varphi) = -\frac{R^2 \varepsilon(\varphi)}{d};$$

the internal force and the external load are:

$$M(\varphi) = -\frac{EI\varepsilon(\varphi)}{d}$$

$$\begin{cases} \frac{Q(\varphi)}{R} + q_s(\varphi) = 0 \\ \frac{dQ(\varphi)}{R d\varphi} + q_y(\varphi) = 0, \\ \frac{dM(\varphi)}{R d\varphi} 1 = -Q(\varphi) \end{cases}$$

where v(φ) is a radial displacement; M and Q are internal forces of the lining, respectively representing a bending moment and a shear force of a section; q represents an external load, where $q_y$ is radial and $q_s$ is circumferential; ε(φ) is a circumferential strain on the inner surface of the structure, and φ is a circumferential angle with section symmetry axis as an origin, d is a radial distance, R is a radius, and E, A and I are material parameters;

based on the above mapping relationship, combined with boundary conditions, inversion results of radial displacement corresponding to strains in various angles, as well as distributions of normal load, circumferential load, shear force and bending moment are solved by using a difference method;

S212, index mapping relationship of multi-center circular tunnel structure:

for the form of multi-center circle with multi-segment arcs spliced, using the inversion function relationship established in the S211 to perform a difference operation in the respective sections of multi-segment arcs. When a center difference is used at the left and right adjacent points of the junction point, expressing the radial displacement by decomposing the x-direction and y-direction displacements of the junction point along different center radius directions.

Example: the calculation model is shown in FIG. 2, FIG. 3A, FIG. 3B, FIG. 3C and FIG. 3D, the elastic modulus E=30 GPa, the Poisson's ratio is 0.2, the section is a rectangular section with a thickness of 0.5 m and a width of 1 m, $R_1$=5.55 m, $R_2$=8.007 m, $R_3$=0.984 m and $R_4$=14.848 m. The calculated boundary condition is the radial displacement at the upper boundary, the rotation angle at the upper boundary is 0, the radial displacement at the lower boundary is 0, and the rotation angle at the lower boundary is 0. Using the continuity condition of the junction point, four equations are established as additions of the boundary conditions, and the above inversion equations are solved by the difference method.

S22, considering uncertain spatial long-linear structural characteristic of tunnel geology, determining the selected sensor type according to the data requirements of the mapping relationship established in the S21, and accordingly constructing the bearing capacity perception layout scheme of the tunnel structure.

Figure 4:
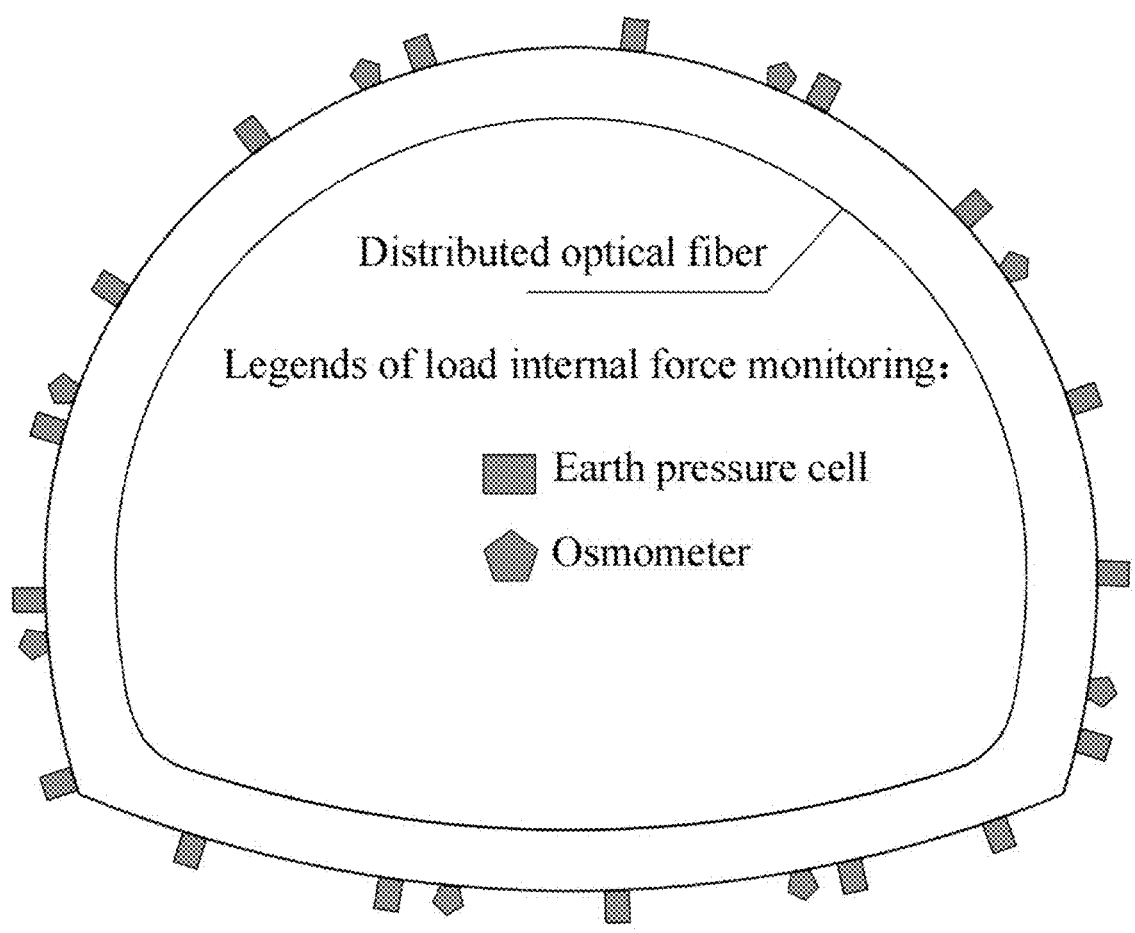
FIG. 4 is a cross-section layout diagram based on displacement inversion according to an embodiment of the present disclosure.
Figure 5:
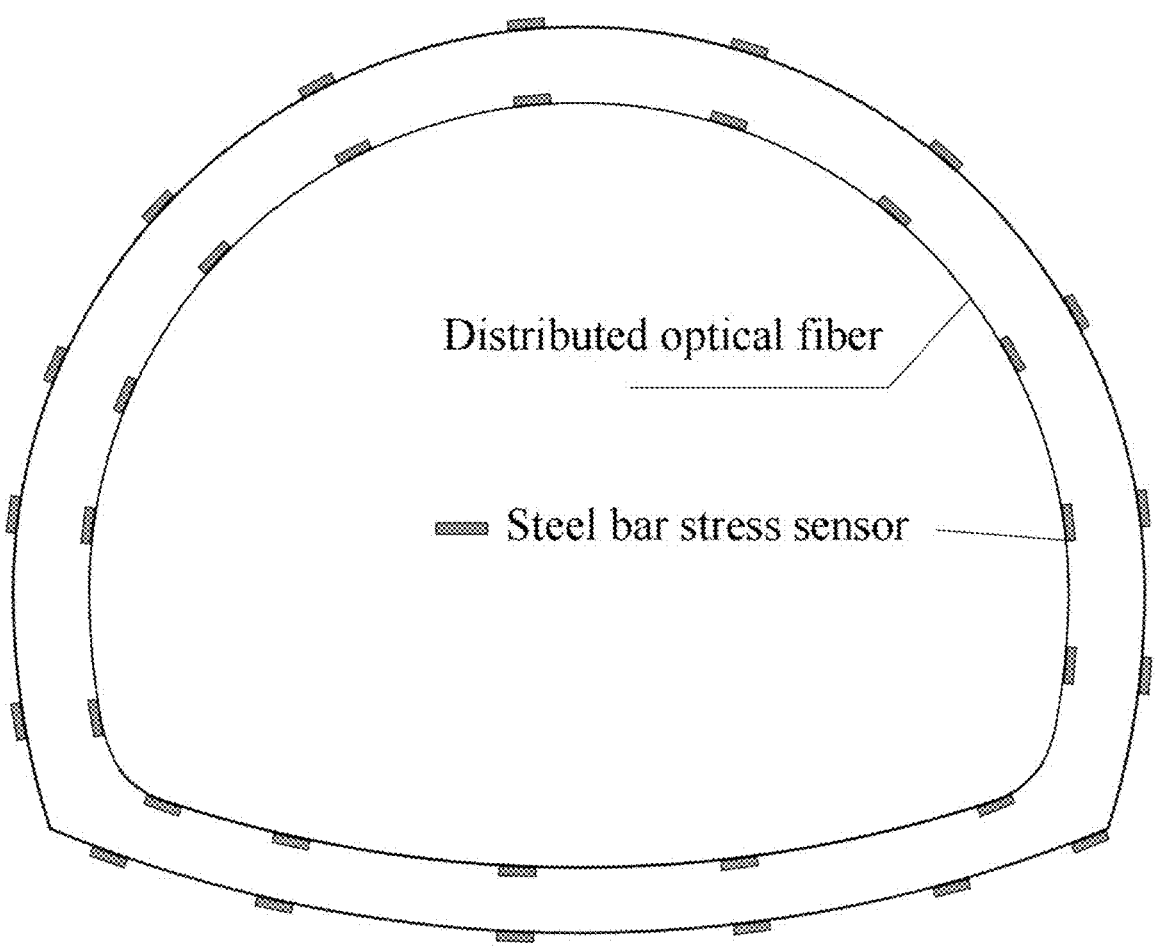
FIG. 5 is a tunnel internal force inversion layout diagram according to an embodiment of the present disclosure.
Figure 6:
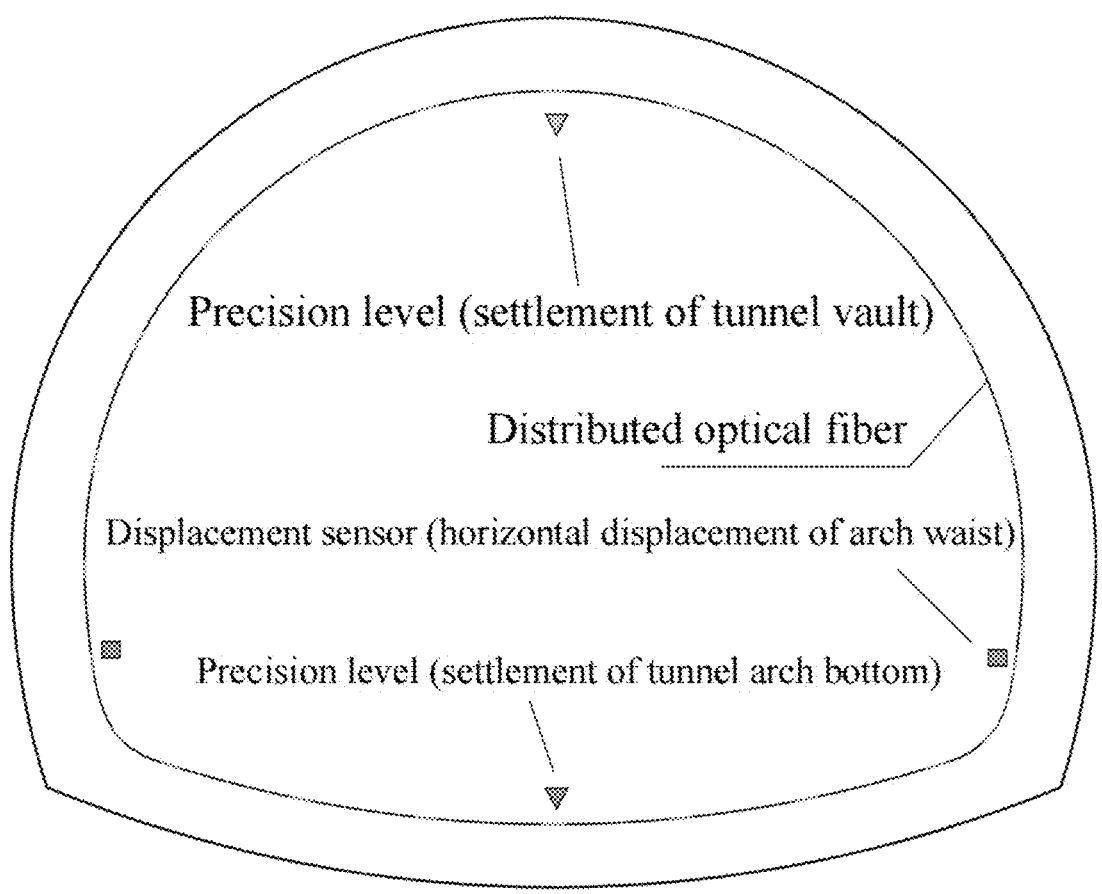
FIG. 6 is an external load inversion layout diagram according to an embodiment of the present disclosure.

Distributed optical fiber sensors are adopted in the specific layout scheme, as shown in FIG. 4, FIG. 5, and FIG. 6. The distributed optical fiber sensors are arranged along the whole section of the monitoring section, and then led out from the section to be measured to the next section to be measured, and spirally arranged at certain intervals along the longitudinal direction of the tunnel, where the spacing of anchor points may be 0.3 m when distributed optical fibers are arranged in the circumferential direction. The displacement values of any two of the test vault, arch bottom and arch waist pointing to the center of the circle are set as boundary conditions.

At the same time, other monitoring devices can be arranged on the tunnel section to provide data for further verification of the inversion results, thus forming a complete system of mutual verification.

S3, calculating the load effect function and the resistance effect function, and constructing the calculation and evaluation method of the tunnel structure bearing capacity, including following sub-steps:

S31, comprehensively applying the actual perception situation and a calculation method with a design specification in the S2, fusing the corresponding reduction/correction coefficients, so as to calculate the load effect function and the resistance effect function.

S311, according to the actual perception of the external load in the S2, where the external load includes normal load and circumferential load, or considering the development and change of the surrounding rock state of the tunnel and the constitutive relation related to the surrounding rock state, referring to the load calculation method in the design code, combined with the load correction coefficient, correcting the load effects such as surrounding rock pressure, water pressure and additional load, where the load correction coefficient is given by referring to the evolution analysis and actual investigation of the surrounding rock action path in the S11; calculating the load effect function q(•) and correcting the load.

For the local water pressure, considering the location, scope of the action and magnitude of the water pressure, correcting the load effect on the basis of the original design load distribution, and superimposing the local water pressure as an additional load, and obtaining a new load effect function q(•).

S312, according to the actual perception of the internal force in the S2, where the internal force includes the shear force and the bending moment, obtaining a value of the resistance effect function R(•) including tensile force, compressive force and shear force of the tunnel structure; or calculating the resistance effect function R(•) according to the current design code, where the geometric dimensions of the structure involved in the calculation, such as the width/thickness of the section, material strength and other factors, are obtained according to the actual investigation value or considering a certain reduction coefficient.

For the tensile effect, according to the current design code:

$$R(f_d, a_d, \bullet \xi) = 1.75 f_d bh\xi/((6e_0/h\xi)-1),$$

where $a_d$ represents a geometric dimension of the structure, and specifically, b and h respectively represent a current section width and a current section thickness, and may be obtained by using the actual field investigation value or the corresponding reduction coefficient based on the design section value; $f_d$ represents the tensile strength of the concrete material under actual conditions, and may be obtained by using the field measured value or considering the certain reduction coefficient based on the strength design value; $\xi$ represents the reduction coefficient used in the calculation; $e_0$ represents an eccentricity of the axial force;

S32, combining the importance coefficient of the structure and the bearing capacity checking coefficient, providing the calculation and evaluation method of the tunnel structure bearing capacity.

S321, according to the load effect function q(•) and the resistance effect function R(•) obtained in the S31, fusing the importance coefficient K and the bearing capacity checking coefficient $Z_1$ of the structure to construct the bearing capacity calculation and evaluation model of the tunnel structure:

$$K_q \leq R(\bullet)Z_1;$$

S322, according to the severity of the tunnel structure damage, the importance coefficient K of the structure should not be less than 1.1 for structural members with a design service life of 100 years or more, and not less than 1.0 for structural members with a design service life of 50 years;

S323, by taking into account the investigation, detection and evaluation results of tunnel lining structure defects and material strength, the bearing capacity checking coefficient $Z_1$ may be expressed by corresponding weights and evaluation scales, and given by items according to corresponding regulations.

In view of the lack of lining thickness, combined with the calculation and analysis experience of the stress state of lining structure accumulated by the project and the Delphi method, the description of the defect condition is refined and quantified according to the specific characterization factors, positions and degrees of the defect condition, and the range of calculation coefficients corresponding to different defect conditions is given, which may be directly compared and used in evaluation. the values of the bearing capacity checking coefficient $Z_1$ of the tunnel structure under the action of two factors with insufficient thickness are shown in Table 1.

TABLE 1

| Defect condition evaluation scale | Characteristic description | $Z_1$ value |
|---|---|---|
| 1 | The thickness is intact. | (1.00, 1.10] |
| 2 | Insufficient thickness is located at the inverted arch, and the thinning ratio is no more than 20%. | (0.95, 1.00] |
| 3 | Insufficient thickness is located at the arch foot, and the thinning ratio is 20-40%. | (0.85, 0.95] |
| 4 | Insufficient thickness is located at the vault, and the thinning ratio is 40-60%. | (0.80, 0.85] |
| 5 | Insufficient thickness is located at the arch waist, and the thinning ratio is more than 60%. | ≤0.80 |

Other defects may be given by reference, and special cases may be determined by the Delphi method.

The embodiment has following beneficial effects:

In this embodiment, firstly, a characterization index system of the highway tunnel bearing capacity is constructed, and secondly, a bearing capacity perception layout scheme of the highway tunnel structure is obtained; finally, the bearing capacity calculation and evaluation model of the highway tunnel structure is constructed, and the bearing capacity perception evaluation on the highway tunnel lining structure is carried out based on the bearing capacity calculation and evaluation model. The embodiment may accurately and quantitatively perceive and evaluate the tunnel structure bearing capacity, and solve basic key technical problems of the safety of the highway tunnel structure.

The embodiment studies the geological load state of the surrounding rock and the caused decay mechanical state of the lining structure, calibrates an attribute scale relative to the tunnel structure bearing capacity, constructs an evaluation system of the tunnel structure bearing capacity under different state responses of surrounding rock and lining, and makes up for shortcomings of the current tunnel structure evaluation method based on structural state description. The disclosure provides key common technical support for following research tasks such as long-term monitoring of tunnel civil structure, structural toughness improvement and digital transformation, which is the basic key technology to promote the high-quality development of the highway tunnels, and with great significance for in-depth analysis of lining bearing state, structural bearing capacity and structural safety.

The above is only a better specific embodiment of the disclosure, but the protection scope of the disclosure is not limited to this. Any change or replacement that may be easily thought of by a person familiar with this technical field within the technical scope disclosed in the disclosure should be covered by the disclosure. Therefore, the protection scope of the disclosure should be based on the protection scope of the claims.

What is claimed is:

1. A perception evaluation method for a bearing capacity of a highway tunnel lining structure, comprising following steps:

constructing a characterization index system of a highway tunnel bearing capacity, wherein the characterization index system comprises: characterization indexes of a load effect evolution state of a surrounding rock and characterization indexes of a decay mechanical state of a lining structure;

constructing a characterization index inversion mapping relationship based on strain data of an inner surface of a highway tunnel lining, obtaining a bearing capacity perception layout scheme of a highway tunnel structure based on the characterization index system, obtaining a complete set of perception method for bearing capacity characterization indexes based on the characterization index system, the characterization index inversion mapping relationship and the bearing capacity perception layout scheme; and comprehensively applying the complete set of perception method for the bearing capacity characterization indexes and a calculation method with a design specification, respectively fusing a load correction coefficient and a reduction coefficient, calculating to obtain a load effect function and a resistance effect function, obtaining a structure importance coefficient and a bearing capacity checking coefficient of the highway tunnel structure, and obtaining a bearing capacity calculation and evaluation model of the highway tunnel structure based on the structure importance coefficient, the bearing capacity checking coefficient, the load effect function and the resistance effect function, the bearing capacity calculation and evaluation model is: $Kq(\bullet) \leq R(\bullet) Z_1$, wherein $q(\bullet)$ is the load effect function, $R(\bullet)$ is the resistance effect function, K is the structure importance coefficient, and $Z_1$ is the bearing capacity checking coefficient, and carrying out a bearing capacity perception evaluation on the highway tunnel lining structure based on the bearing capacity calculation and evaluation model, wherein the structure importance coefficient (K) and the bearing capacity checking coefficient ($Z_1$) of the structure are fused to construct the bearing capacity calculation and evaluation model of the tunnel structure;

a process of constructing the characterization index system of the highway tunnel bearing capacity comprises:

obtaining geological types of a highway tunnel, and based on the geological types, combining with a load response correction method of a geological uncertainty evolution of the surrounding rock, obtaining the characterization indexes of the load effect evolution state of the surrounding rock;

respectively obtaining deformation indexes, stress indexes, damage characteristic indexes and environmental indexes of the highway tunnel, and obtaining the characterization indexes of the decay mechanical state of the lining structure based on the deformation indexes, the stress indexes, the damage characteristic indexes and the environmental indexes; and according to a classification of different geological types, constructing a key characterization index system of a tunnel structure bearing capacity based on the characterization indexes of the load effect evolution state of the surrounding rock and the characterization indexes of the decay mechanical state of the lining structure;

a process of constructing the characterization index inversion mapping relationship based on the strain data on the inner surface of the highway tunnel lining comprises:

deducing a radial displacement v(4) from a geometric equation of a curved beam theory as $$\frac{d^2 v(\varphi)}{d\varphi^2} + v(\varphi) = -\frac{R^2 \varepsilon(\varphi)}{d};$$

and an internal force and an external load are as follows:

$$M(\varphi) = -\frac{EI\varepsilon(\varphi)}{d},$$

$$\begin{cases} \frac{Q(\varphi)}{R} + q_s(\varphi) = 0 \\ \frac{dQ(\varphi)}{Rd\varphi} + q_y(\varphi) = 0, \\ \frac{dM(\varphi)}{Rd\varphi} = -Q(\varphi) \end{cases}$$

wherein v(φ) is the radial displacement; M and Q are lining internal forces, respectively representing a bending moment and a shear force of a section; q represents an external load, wherein $q_y$ is radial and $q_s$ is circumferential; ε(φ) is a circumferential strain on an inner surface of a structure, and φ is a circumferential angle with a section symmetry axis as an origin, d is a radial distance, R is a radius, and E, A and I are material parameters;

a process of obtaining the bearing capacity perception layout scheme of the highway tunnel structure comprises:

defining an inversion data requirement based on the characterization index inversion mapping relationship, determining a sensor type based on a spatial long-linear structural characteristic of the geological types and the inversion data requirement, and obtaining the bearing capacity perception layout scheme of the highway tunnel structure based on the sensor type, the structural characteristic and the inversion data requirement;

a process of calculating the load effect function and the resistance effect function comprises:

obtaining the load correction coefficient based on the characterization indexes of the load effect evolution state of the surrounding rock, comprehensively applying the complete set of perception method for the bearing capacity characterization indexes and the calculation method with the design specification, fusing the load correction coefficient, and obtaining the load effect function;

comprehensively applying the complete set of perception method for the bearing capacity characterization indexes and the calculation method with the design specification, fusing the reduction coefficient, and obtaining the resistance effect function; and the bearing capacity calculation and evaluation model is: $K_q \leq R(\bullet)Z_1$;

wherein q is the load effect function, R(•) is the resistance effect function, K is the structure importance coefficient, and $Z_1$ is the bearing capacity checking coefficient.

2. The method according to claim 1, wherein the highway tunnel structure comprises a single-center circular tunnel structure and a multi-center circular tunnel structure, and the structure importance coefficient of the single-center circular tunnel structure and the single-center circular tunnel structure is not be less than 1.1 for structural members with a design service life of 100 years or more, and not less than 1.0 for structural members with a design service life of 50 years.

* * * * *